United States Patent [19]

Cuevas

[11] Patent Number: 5,570,904
[45] Date of Patent: Nov. 5, 1996

[54] AIR BAG INFLATOR WITH MOVABLE CONTAINER

[75] Inventor: Jess A. Cuevas, Scottsdale, Ariz.

[73] Assignee: TRW Inc., Lyndhurst, Ohio

[21] Appl. No.: 602,270

[22] Filed: Feb. 16, 1996

Related U.S. Application Data

[63] Continuation of Ser. No. 304,487, Sep. 12, 1994, abandoned.

[51] Int. Cl.$^6$ ................................................. B60R 21/26
[52] U.S. Cl. ............................................ 280/737; 280/741
[58] Field of Search ............................... 280/741, 736, 280/742, 740, 737; 102/530, 531; 222/3, 5

[56]  References Cited

U.S. PATENT DOCUMENTS

| | | | |
|---|---|---|---|
| 3,951,428 | 4/1976 | Sugiura et al. | 280/737 |
| 4,981,534 | 1/1991 | Scheffe | 280/741 |
| 5,062,367 | 11/1991 | Hayashi et al. | 280/741 |
| 5,100,174 | 3/1992 | Jasken et al. | 280/741 |
| 5,131,680 | 7/1992 | Coultas et al. . | |
| 5,160,163 | 11/1992 | Castagner et al. | 280/741 |
| 5,344,186 | 9/1994 | Bergerson et al. | 280/741 |
| 5,350,192 | 9/1994 | Blumenthal | 280/737 |
| 5,356,176 | 10/1994 | Wells | 280/737 |
| 5,364,127 | 11/1994 | Cuevas | 222/3 |
| 5,388,859 | 2/1995 | Fischer et al. . | |

*Primary Examiner*—Eric D. Culbreth
*Attorney, Agent, or Firm*—Tarolli, Sundheim, Covell, Tummino & Szabo

[57]  ABSTRACT

An apparatus (10) for inflating an air bag (12) comprises a first container (15) defining a first chamber (18) filled with inflation fluid. A second container (64) is movable within the first chamber and defines a second chamber (69). The second chamber contains ignitable material (80). An igniter (90) ignites the ignitable material (80) in the second chamber in response to an actuating signal and thereby develops a thrust to propel the second container (64) within the first chamber (18) in a predetermined direction. By igniting the ignitable material (80), the igniter (90) also produces combustion products including heat for heating and pressurizing the inflation fluid in the first chamber (18) to increase the temperature and pressure of the inflation fluid. The inflation fluid is directed from the first chamber (18) into the air bag (12) to inflate the air bag. The second container (64) includes tabs (99) which move from a retracted condition to an extended condition when the second container (64) is propelled within the first chamber (18) in the predetermined direction. When extended, the tabs (99) frictionally engage the first container (15) to resist movement of the second container (64) in a direction opposite the predetermined direction.

21 Claims, 3 Drawing Sheets

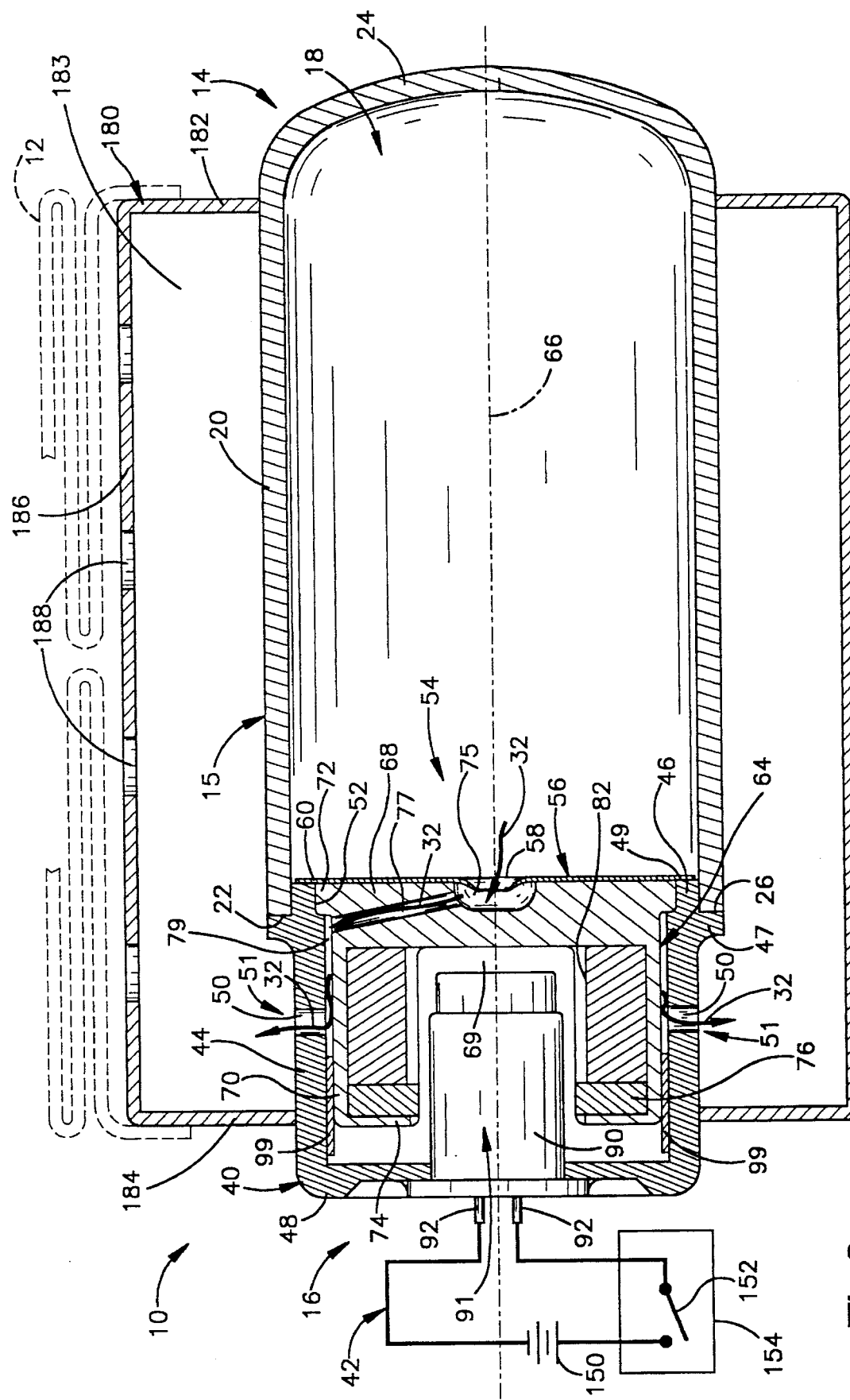

AIR BAG INFLATOR WITH MOVABLE CONTAINER

This application is a continuation of application Ser. No. 08/304,487 filed on Sep. 12, 194, abandoned.

FIELD OF THE INVENTION

The present invention relates to an apparatus for inflating an inflatable device, such as an air bag that restrains an occupant of a vehicle in the event of sudden vehicle deceleration indicative of a collision.

BACKGROUND OF THE INVENTION

An apparatus for inflating an inflatable vehicle occupant restraint, such as an air bag, is disclosed in U.S. Pat. No. 5,131,680 (the '680 patent). The apparatus disclosed in the '680 patent includes a container which stores gas for inflating the vehicle occupant restraint. The apparatus further includes a body of pyrotechnic material and an igniter assembly for igniting the body of pyrotechnic material. The igniter assembly includes an ignition material which rapidly burns at a relatively high temperature to generate heat and flame. The heat and flame generated by the ignition material ignite the body of pyrotechnic material. As the body of pyrotechnic material burns, hot combustion products emitted by the body of pyrotechnic material pressurize and supplement the stored gas.

The apparatus disclosed in the '680 patent also includes an actuator assembly which operates in response to vehicle deceleration indicative of a collision. The actuator assembly operates to actuate the igniter assembly, and also to rupture a burst disk to release a flow of gas from the container. The actuator assembly includes an ignition material which, when ignited, generates pressure against the head of a piston to move the piston. The moving piston ruptures the burst disk and strikes the igniter assembly to ignite the ignition material in the igniter assembly. The ignition material in the igniter assembly then ignites the body of pyrotechnic material within the container.

SUMMARY OF THE INVENTION

In accordance with the present invention, an apparatus for use in inflating an air bag comprises first container means defining a first chamber filled with inflation fluid. The apparatus further comprises second container means movable within the first chamber and defining a second chamber. The second chamber contains ignitable material. Igniter means ignites the ignitable material in the second chamber and thereby develops a thrust to propel the second container means within the first chamber in a predetermined direction. By igniting the ignitable material in the second chamber, the igniter means also produces combustion products including heat for heating and pressurizing the inflation fluid in the first chamber to increase the temperature and pressure of the inflation fluid as the second container means is being propelled within the first chamber in the predetermined direction. Means is provided for directing the inflation fluid from the first chamber to the air bag. The second container means includes tab means movable from a retracted condition to an extended condition. When extended, the tab means engages the first container means to resist movement of the second container means in a direction opposite the predetermined direction.

Preferably, the ignitable material in the second chamber at least partially encircles the igniter means. The igniter means and the ignitable material in the second chamber are separate from each other and spaced apart from each other. Also, the first container means includes a rupturable wall having (i) a first predefined portion which breaks away upon the second container means being propelled within the first chamber, and (ii) a second predefined portion which breaks away when the first predefined portion is unbroken and the pressure in the first chamber exceeds a predetermined pressure to relieve pressure in the first chamber.

BRIEF DESCRIPTION OF THE DRAWINGS

The foregoing and other features of the present invention will become apparent to those skilled in the art to which the present invention relates from reading the following description of the invention with reference to the accompanying drawings, in which:

FIG. 3 is a view of the apparatus of FIG. 1 in an overpressurized, unactuated condition.

DESCRIPTION OF A PREFERRED EMBODIMENT

Figure 1:
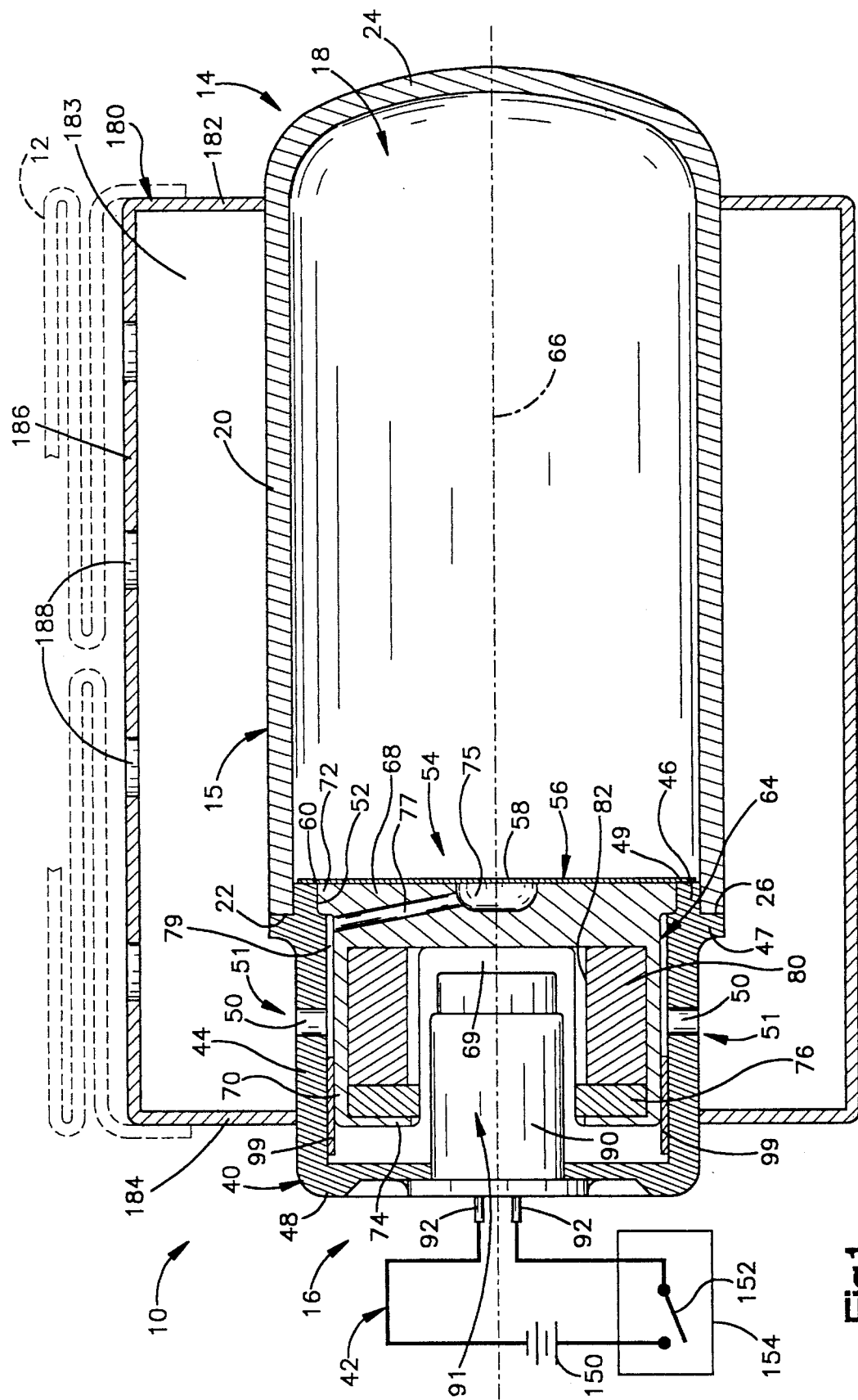
FIG. 1 is a schematic view of a vehicle occupant restraint apparatus in an unactuated condition and constructed in accordance with the present invention.
Figure 2:
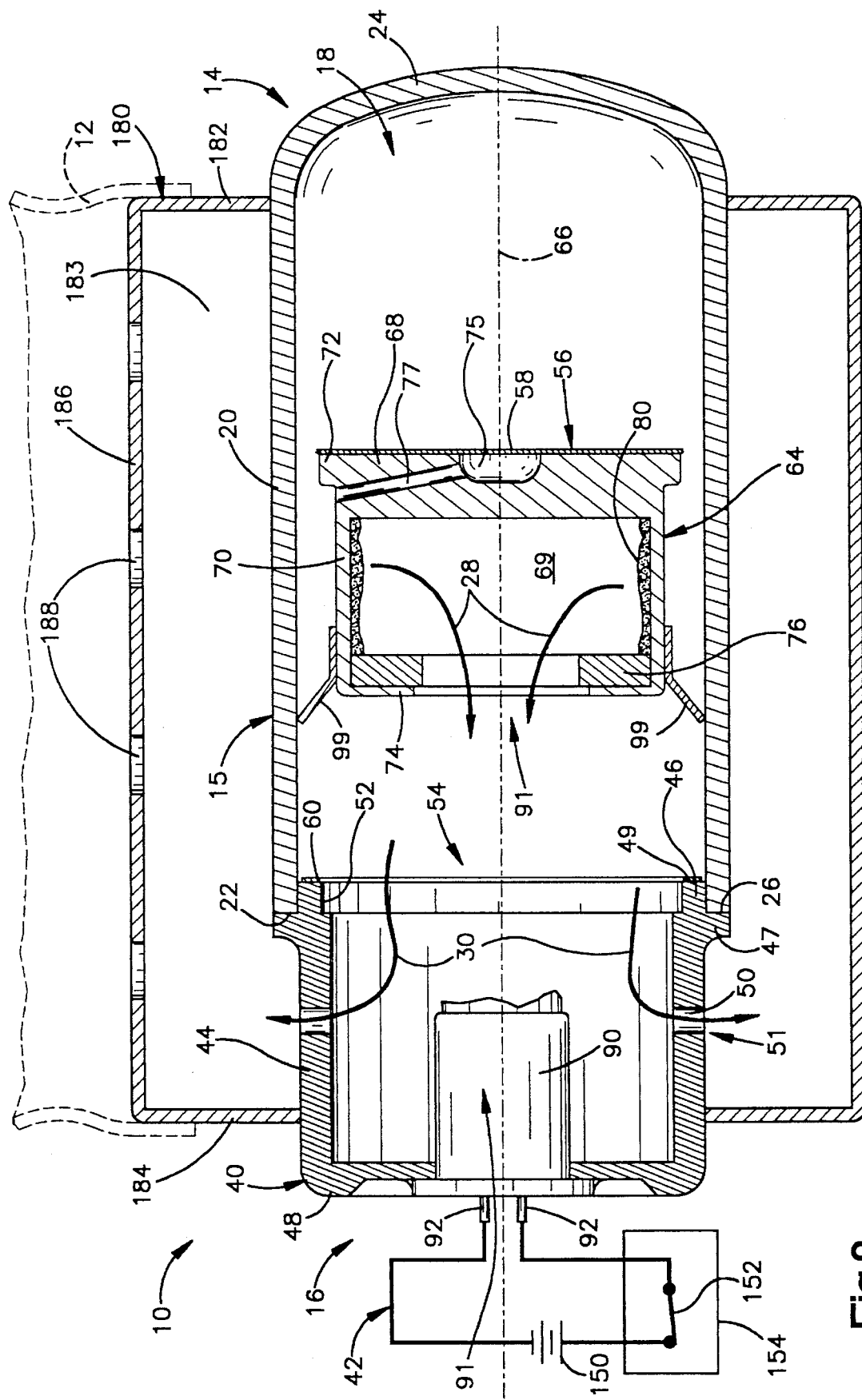
FIG. 2 is a view of the apparatus of FIG. 1 in an actuated condition.

As shown schematically in FIGS. 1 and 2, a vehicle occupant restraint apparatus 10 includes an inflatable vehicle occupant restraint 12, which is commonly referred to as an air bag. The apparatus 10 has an unactuated condition in which the air bag 12 is stored in a folded condition, as indicated in FIG. 1, and has an actuated condition in which the air bag 12 is inflated, as indicated in FIG. 2. The apparatus 10 is actuated in response to vehicle deceleration of at least a predetermined magnitude indicative of a collision. The air bag 12 is then inflated from the stored, folded condition to the inflated condition in which it restrains movement of a vehicle occupant and protects the vehicle occupant from forcibly striking parts of the vehicle.

The apparatus 10 further includes a pressure vessel 14. The pressure vessel 14 includes a tank 15 and an actuator assembly 16. The tank 15 and the actuator assembly 16 together define a sealed chamber 18 containing an inflation fluid, which is preferably a gas, for inflating the air bag 12. The actuator assembly 16 operates to release the gas from the chamber 18 upon the occurrence of vehicle deceleration indicative of a collision. The tank 15 has a cylindrical side wall portion 20, an annular end wall surface 22, and an end wall portion 24 located at the end of the side wall portion 20 opposite the surface 22. The end wall portion 24 of the tank 15 has a surface which defines an opening (not shown) extending through the end wall portion 24.

An end cap (also not shown) is closely received in the opening in the end wall portion 24 of the tank 15. The end cap has a passage through which gas is conducted into the chamber 18. When the chamber 18 has been filled with gas at a desired pressure, the passage in the end cap is closed. The end cap may also include a conventional pressure switch which monitors the gas pressure in the chamber 18 to alert an occupant of the vehicle if the gas pressure drops below a predetermined level.

The inflation fluid in the chamber 18 may comprise a single gas or a mixture of gases. The inflation fluid in the chamber 18 is preferably a gas or a mixture of gases essentially free of components that would be ignitable and combustible within the chamber 18. The compositions of such gases and mixtures of gases which are suitable for inflating the air bag 12 are known in the art. For example, argon is known as a preferred gas for inflating an air bag. The chamber 18 is preferably filled with argon.

The actuator assembly 16 includes a manifold 40 and an electrical circuit 42. The manifold 40 has a cylindrical side wall portion 44, an annular first end wall portion 46 and a circular second end wall portion 48. The manifold 40 also has a lip portion 47 which projects outwardly from between the cylindrical side wall portion 44 and the first end wall portion 46. The lip portion 47 of the manifold 40 has an annular edge surface 26 which abuts and is welded to the end wall surface 22 of the pressure vessel 14. The cylindrical side wall portion 44 of the manifold 40 further has a plurality of annular inner edge surfaces 50 defining a circumferentially extending array of gas flow openings 51.

A diffuser 180 includes opposite annular end portions 182, 184 and a side wall portion 186 interconnecting the opposite annular end portions. The end portion 182 is welded to the side wall portion 20 of the tank 15, and the end portion 184 is welded to the side wall portion 44 of the manifold 40. The air bag 12 is attached to the end portions 182, 184 of the diffuser 180 in a known manner. The end portions 182, 184 define in part a diffuser chamber 183 located between the end portions 182, 184. The side wall portion 186 of the diffuser 180 has a plurality of gas flow openings 188 through which inflation fluid can flow from the diffuser chamber 183 into the air bag 12.

The first end wall portion 46 of the manifold 40 has an annular inner edge surface 52 defining a circular gas exit opening 54. The gas exit opening 54 is closed by a rupturable wall 56. The rupturable wall 56 has a central portion 58 and an annular rim portion 60. The central portion 58 extends over the gas exit opening 54. The rim portion 60 of the rupturable wall is welded to an annular edge surface 49 of the first end wall portion 46 of the manifold 40. The rupturable wall 56 is thus supported on the manifold 40, and blocks gas from flowing outward from the chamber 18 through the gas exit opening 54, the gas flow openings 51 in the manifold 40, and the gas flow openings 188 in the diffuser 180 into the air bag 12.

A combustion canister 64 having a longitudinal central axis 66 is supported in the manifold 40. The canister 64 includes a circular base portion 68 and a cylindrical canister portion 70 which extends from the circular base portion 68 along the axis 66. A lip portion 72 extends radially outwardly of the circular base portion 68. The circular base portion 68 has a hollow central portion 75 and a passage 77 which extends between the hollow central portion 75 and an annular space 79 between the cylindrical canister portion 70 and the side wall portion 44 of the manifold 40 adjacent the lip portion 72, as shown in FIG. 1.

A plurality of tab members 99 are attached, such as by welding, to the outer periphery of the canister portion 70 of the canister 64. The tab members 99 are made of spring steel and are biased outward of the canister portion 70. Any suitable number of tab members 99 may be used, but preferably there are four tab members equally spaced around the circumference of the canister portion 70. The tab members 99 are shown in FIG. 1 in a retracted condition. When the tab members 99 are in the retracted condition shown in FIG. 1, the tab members 99 press against the inner circumferential surface of the cylindrical side wall portion 44 of the manifold 40.

An annular end portion 74 of the combustion canister 64 extends radially inwardly from an end of the cylindrical canister portion 70 opposite to the base portion 68. The annular end portion 74 defines a rearwardly facing opening 91 in the canister portion 70 of the canister 64. The annular end portion 74 also defines, in part, a chamber 69 within the canister portion 70 of the canister 64. A ring-shaped ceramic insulator 76 is located in the chamber 69 adjacent the annular end portion 74. The insulator 76 is secured to the annular end portion 74 with a suitable adhesive material.

An ignitable propellant material 80 is disposed in the chamber 69 of the canister portion 70 of the canister 64. The ignitable propellant material 80 is preferably $BKNO_3$, and is preferably shaped as a ring which is closely fitted within the chamber 69 against the canister portion 70 of the canister 64 between the ceramic insulator 76 and the circular base portion 68, as shown in FIG. 1. The ignitable propellant material 80 thus has a cylindrical inner surface 82 extending along the longitudinal central axis 66 of the canister portion 70 of the canister 64.

An igniter 90 separate from the canister 64 extends through an opening in the second end wall portion 48 of the manifold 40. The igniter 90 also extends through the rearwardly facing opening 91 in the canister portion 70. As shown in FIG. 1, the igniter 90 and the canister portion 70 of the canister 64, including the ignitable propellant material 80 contained in the chamber 69 of the canister portion 70, are spaced apart from each other. The ignitable propellant material 80 contained in the chamber 69 of the canister portion 70 encircles the igniter 90, as shown in FIG. 1. The igniter 90 is of known construction, and emits products of combustion when actuated upon the passage of electric current between a pair of electrically conductive pins 92 in the igniter 90. The igniter 90 is fixed to the second end wall portion 48 of the manifold 40, such as by a weld, crimp, or the like.

The electrical circuit 42 includes a power source 150, which is preferably the vehicle battery, and a normally open switch 152. The switch 152 is preferably part of a vehicle deceleration sensor 154. The deceleration sensor 154 senses vehicle deceleration which is indicative of a collision, and closes the switch 152 in response to such vehicle deceleration. Such a deceleration sensor is known in the art. The electrical circuit 42 extends through the igniter 90 between the pins 92.

When the vehicle experiences a collision, the deceleration sensor 154 senses the deceleration of the vehicle that is caused by the collision and closes the switch 152. When the switch 152 is closed, electric current passes through the igniter 90 between the pins 92. The igniter 90 is then actuated and emits products of combustion which move into the canister portion 70 of the canister 64. The products of combustion emitted by the igniter 90 move against the cylindrical inner surface 82 of the tubular body of ignitable propellant material 80 to ignite the tubular body of ignitable propellant material 80 along its length. The ignitable propellant material 80 then burns and emits products of combustion, including heat, flame and hot particles in the chamber 69 of the canister portion 70 of the canister 64.

The combustion products emitted by the ignitable propellant material 80 are initially contained within the chamber 69 of the canister portion 70 of the canister 64. The combustion products and the gas within the chamber 69 increase in pressure as the ignitable propellant material 80 burns. The increasing pressure in the chamber 69 acts axially against the circular base portion 68.

When the increasing pressure in the chamber 69 reaches a predetermined elevated level, the force of the pressure against the circular base portion 69 becomes great enough to move the canister 64 against the rupturable wall 56 forcefully enough to rupture the rupturable wall 56, as shown in FIG. 2. When the rupturable wall 56 is thus ruptured, the force of the pressure in the chamber 69 acting axially against the circular base portion 68 acts as a thrust which propels the canister 64 axially away from the second end wall portion 48 and into the chamber 18. The canister 64 thus opens the pressure vessel 14 to release the gas from the chamber 18.

The combustion products emitted by the ignitable propellant material 80, including heat, flame and hot particles, emerge from the opening 91 (shown with arrows 28 in FIG. 2) as the canister 64 is being propelled through the gas in the chamber 18. The combustion products are thus dispersed in the gas in the chamber 18 sufficiently to heat and further pressurize the gas substantially uniformly and rapidly throughout the chamber 18. The combustion products will heat and further pressurize the gas within the chamber 18 but will not ignite the gas because, as noted above, the gas is not ignitable within the chamber 18.

The further pressurized gas in the chamber 18 flows through the gas exit opening 54 and through the gas flow openings 51 (shown with arrow lines 30 in FIG. 2) into the diffuser chamber 183. The diffuser 180 then directs the gas to flow from the diffuser chamber 183 into the air bag 12 to inflate the air bag 12 fully and rapidly. The manifold 40 and the diffuser 180 thus both act to direct the inflation fluid from the chamber 18 to the air bag 12.

During movement of the canister 64 from the position shown in FIG. 1 to the position shown in FIG. 2, the tab members 99 move from the retracted condition shown in FIG. 1 to an extended condition shown in FIG. 2. When the tab members 99 are in the extended condition shown in FIG. 2, the tab members 99 frictionally engage the inner surface of the side wall portion 20 to resist movement of the canister 64 in a backward direction toward the position shown in FIG. 1.

Referring to FIG. 3, the apparatus 10 is shown in an unactuated condition but having an abnormally high pressure condition in the chamber 18. In the event of an abnormally high pressure condition in the chamber 18, the rupturable wall 56 will rupture in its central region, as shown in FIG. 3. When the rupturable wall 56 ruptures in its central region as shown in FIG. 3, the inflation fluid in the chamber 18 flows (shown with arrows 32 in FIG. 3) into the hollow central portion 75 of the circular base portion 68 and then through the passage 77 into the annular space 79 in the canister portion 70. The inflation fluid then passes through the openings 51 in the manifold 40 and thereby relieves the pressure in the chamber 18.

From the above description of the invention, those skilled in the art to which the present invention relates will perceive improvements, changes and modifications. Such improvements, changes and modifications within the skill of the art to which the present invention relates are intended to be covered by the appended claims.

Having described the invention, the following is claimed:

1. An apparatus for use in inflating an air bag, said apparatus comprising:

first container means for defining a first chamber filled with inflation fluid;

second container means movable within said first chamber and for defining a second chamber, said second chamber containing ignitable material;

igniter means for igniting said ignitable material in said second chamber and developing a thrust to propel said second container means within said first chamber in a predetermined direction and producing combustion products including heat for heating and pressurizing said inflation fluid in said first chamber to increase the temperature and pressure of said inflation fluid as said second container means is being propelled within said first chamber in said predetermined direction;

means for directing said inflation fluid from said first chamber to the air bag; and said second container means including tab means movable from a retracted condition to an extended condition and for, when in the extended condition, engaging said first container means to resist movement of said second container means in a direction opposite said predetermined direction.

2. An apparatus according to claim 1 wherein said means for directing said inflation fluid from said first chamber into the air bag includes a diffuser having a plurality of openings through which said inflation fluid flows from said first chamber of said first container means into the air bag.

3. An apparatus according to claim 1 wherein said first container means includes a rupturable wall which, when ruptured, defines an exit opening through which said inflation fluid flows outward from said first chamber of said first container means, said second container means being propelled against said rupturable wall to rupture said rupturable wall when said ignitable material in said second container means is ignited.

4. An apparatus according to claim 1 wherein said tab means engages said means for directing said inflation fluid from said first chamber into the air bag when said tab means is in the retracted condition.

5. An apparatus according to claim 1 wherein said tab means comprises a plurality of tabs biased outward of said second container means and located along an outer periphery of said second container means.

6. An apparatus for use in inflating an air bag, said apparatus comprising:

first container means for defining a first chamber filled with inflation fluid;

an opening in said first container means through which inflation fluid may flow to inflate the air bag;

a rupturable wall extending across the opening to block flow through the opening;

second container means movable within said first chamber and for defining a second chamber, said second container means supporting a portion of said wall, said second chamber containing ignitable material;

igniter means for igniting said ignitable material in said second chamber and developing a thrust to propel said second container means within said first chamber in a predetermined direction and producing combustion products including heat for heating and pressurizing said inflation fluid in said first chamber to increase the temperature and pressure of said inflation fluid as said second container means is being propelled within said first chamber in said predetermined direction;

said ignitable material in said second chamber at least partially encircling said igniter means; and means for directing said inflation fluid from said first chamber to the air bag.

7. An apparatus according to claim 6 wherein said means for directing said inflation fluid from said first chamber into the air bag includes a diffuser having a plurality of openings through which said inflation fluid flows from said first chamber of said first container means into the air bag.

8. An apparatus according to claim 6 wherein said second container means being propelled through said rupturable wall to rupture said rupturable wall when said ignitable material in said second container means is ignited.

9. An apparatus according to claim 8 wherein said rupturable wall includes (i) a first predefined portion which breaks in response to said second container means being propelled, and (ii) a second predefined portion which breaks away to relieve pressure in said first chamber when said first predefined portion is unbroken and the pressure in said first chamber exceeds a predetermined pressure.

10. An apparatus according to claim 6 wherein said second container means including tab means movable from a retracted condition to an extended condition and for, when in the extended condition, engaging said first container means to resist movement of said second container means in a direction opposite said predetermined direction.

11. An apparatus according to claim 10 wherein said tab means engages said means for directing said inflation fluid from said first chamber into the air bag when said tab means is in the retracted condition.

12. An apparatus according to claim 10 wherein said tab means comprises a plurality of tabs biased outward of said second container means and located along an outer periphery of said second container means.

13. An apparatus for use in inflating an air bag, said apparatus comprising:

first container means for defining a first chamber filled with inflation fluid;

second container means movable within said first chamber and for defining a second chamber, said second chamber containing ignitable material;

igniter means for igniting said ignitable material in said second chamber and developing a thrust to propel said second container means within said first chamber in a predetermined direction and producing combustion products including heat for heating and pressurizing said inflation fluid in said first chamber to increase the temperature and pressure of said inflation fluid as said second container means is being propelled within said first chamber in said predetermined direction;

said first container means including a rupturable wall having (i) a first predefined portion which breaks away upon said second container means being propelled within said first chamber, and (ii) a second predefined portion which breaks away to relieve pressure in said first chamber when said first predefined portion is unbroken and the pressure in said first chamber exceeds a predetermined pressure; and means for directing said inflation fluid from said first chamber to the air bag.

14. An apparatus according to claim 13 wherein said second container means is propelled against said rupturable wall to break away said first predefined portion when said ignitable material in said second container means is ignited.

15. An apparatus for use in inflating an air bag, said apparatus comprising:

first container means for defining a first chamber filled with inflation fluid;

second container means movable within said first chamber and for defining a second chamber, said second chamber containing ignitable material, said second container means being guided by a portion of said first container means for predetermined distance;

igniter means for igniting said ignitable material in said second chamber and developing a thrust to propel said second container means within said first chamber in a predetermined direction and producing combustion products including heat for heating and pressurizing said inflation fluid in said first chamber to increase the temperature and pressure of said inflation fluid as said second container means is being propelled within said first chamber in said predetermined direction, said igniter means and said ignitable material in said second chamber being separate from each other and radially spaced apart from each other; and means for directing said inflation fluid from said first chamber to the air bag.

16. An apparatus according to claim 15 wherein said means for directing said inflation fluid from said first chamber into the air bag includes a diffuser having a plurality of openings through which said inflation fluid flows from said first chamber of said first container means into the air bag.

17. An apparatus according to claim 15 wherein said first container means includes a rupturable wall which, when ruptured, defines an exit opening through which said inflation fluid flows outward from said first chamber of said first container means, said second container means being propelled against said rupturable wall to rupture said rupturable wall when said ignitable material in said second container means is ignited.

18. An apparatus according to claim 17 wherein said rupturable wall includes (i) a first predefined portion which breaks in response to said second container means being propelled, and (ii) a second predefined portion which breaks away to relieve pressure in said first chamber when said first predefined portion is unbroken and the pressure in said first chamber exceeds a predetermined pressure.

19. An apparatus according to claim 15 wherein said second container means including tab means movable from a retracted condition to an extended condition and for, when in the extended condition, engaging said first container means to resist movement of said second container means in a direction opposite said predetermined direction.

20. An apparatus according to claim 19 wherein said tab means engages said means for directing said inflation fluid from said first chamber into the air bag when said tab means is in the retracted condition.

21. An apparatus according to claim 19 wherein said tab means comprises a plurality of tabs biased outward of said second container means and located along an outer periphery of said second container means.

\* \* \* \* \*